(12) United States Patent
Yamamoto et al.

(10) Patent No.: US 11,992,887 B2
(45) Date of Patent: May 28, 2024

(54) DRILL

(71) Applicant: MITSUBISHI MATERIALS CORPORATION, Tokyo (JP)

(72) Inventors: Tadashi Yamamoto, Tokyo (JP); Takahiro Hibi, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 51 days.

(21) Appl. No.: 17/603,387

(22) PCT Filed: Apr. 7, 2020

(86) PCT No.: PCT/JP2020/015700
§ 371 (c)(1),
(2) Date: Oct. 13, 2021

(87) PCT Pub. No.: WO2020/213482
PCT Pub. Date: Oct. 22, 2020

(65) Prior Publication Data
US 2022/0212272 A1 Jul. 7, 2022

(30) Foreign Application Priority Data
Apr. 17, 2019 (JP) .................. 2019-078605

(51) Int. Cl.
B23B 51/02 (2006.01)

(52) U.S. Cl.
CPC ........ B23B 51/02 (2013.01); *B23B 2251/085* (2013.01); *B23B 2251/188* (2022.01)

(58) Field of Classification Search
CPC ........ B23B 2251/188; B23B 2251/182; B23B 2251/18; B23B 2251/085; B23B 51/02
See application file for complete search history.

(56) References Cited

U.S. PATENT DOCUMENTS

| 5,273,380 A | 12/1993 | Musacchia |
| 2009/0028654 A1 | 1/2009 | Turrini |

(Continued)

FOREIGN PATENT DOCUMENTS

| DE | 10106035 B4 | 12/2008 |
| JP | S52-095187 U | 7/1977 |

(Continued)

OTHER PUBLICATIONS

International Search Report dated Jun. 23, 2020, issued for PCT/JP2020/015700 and English translation thereof.

(Continued)

*Primary Examiner* — Alan Snyder
(74) *Attorney, Agent, or Firm* — Locke Lord LLP (57) ABSTRACT

In this drill, a cutting edge, which is formed at an intersecting ridge line part between a wall surface, facing a drill rotation direction, of a chip discharging flute formed at an outer periphery of a tip portion of a drill main body that is rotated around an axis, and a tip flank face, includes an inner peripheral cutting edge located on a radially inner peripheral side with respect to the axis; and an outer peripheral cutting edge connected to a radially outer peripheral side of the inner peripheral cutting edge. A point angle of a portion of the inner peripheral cutting edge on an inner peripheral side with respect to the axis is within a range of 90° to 170°.

2 Claims, 5 Drawing Sheets

(56) References Cited

U.S. PATENT DOCUMENTS

2012/0201619 A1    8/2012  Olsson
2017/0274461 A1*   9/2017  Mabuchi ................. B23B 51/02

FOREIGN PATENT DOCUMENTS

| JP | 2000-198011 A  | 7/2000  |
|----|----------------|---------|
| JP | 2009-502538 A  | 1/2009  |
| JP | 2009-028895 A  | 2/2009  |
| JP | 2011-104751 A  | 6/2011  |
| JP | 2012-035359 A  | 2/2012  |
| JP | 2012-161912 A  | 8/2012  |
| JP | 2014-516813 A  | 7/2014  |
| JP | 2017-164836 A  | 9/2017  |
| WO | 2007/015095 A1 | 2/2007  |
| WO | 2012/095479 A1 | 7/2012  |
| WO | 2012/171915 A1 | 12/2012 |

OTHER PUBLICATIONS

Supplementary European Search Report dated Jun. 2, 2023, issued for European Patent Application No. 20791466.4.
Notioce of Allowance dated Sep. 26, 2023, issued for JP2019-078605 and English translation thereof.

* cited by examiner

DRILL

TECHNICAL FIELD

The present invention relates to a drill including a chip discharging flute that opens to a tip flank face of a drill main body and extends to a posterior end side, the chip discharging flute being formed at an outer periphery of a tip portion of the drill main body that is rotated around an axis and a cutting edge that is formed at an intersecting ridge line part between a wall surface of the chip discharging flute facing a drill rotation direction and the tip flank face.

Priority is claimed on Japanese Patent Application No. 2019-078605 filed Apr. 17, 2019, the content of which is incorporated herein by reference.

BACKGROUND ART

In such a drill, for example, Patent Document 1 describes, as a counterboring drill, one in which the cutting edge includes, a first concavely curved cutting edge, a second concavely curved cutting edge, and a central cutting edge in order from the outer peripheral side of the drill main body when viewed from a forward side in the drill rotation direction. The first concavely curved cutting edge extends to a tip side in an axial direction after extending to a posterior end side in the axial direction while being concavely curved as approaching an inner peripheral side from an outer peripheral end of the cutting edge. The second concavely curved cutting edge is connected to the first concavely curved cutting edge and extends to the tip side in the axial direction while being further concavely curved as approaching the inner peripheral side. The central cutting edge intersects the second concavely curved cutting edge at an obtuse angle so as to be concavely bent and extends linearly to the tip side beyond the outer peripheral end of the cutting edge in the axial direction as approaching the inner peripheral side.

Here, the first and second concavely curved cutting edges form a concave curve shape even when viewed from the tip in the axial direction, and the curvature radius of the first concavely curved cutting edge, when viewed from the tip in the axial direction, is made larger than the curvature radius of the second concavely curved cutting edge. Additionally, a radius R4 from an axis to a position where the first concavely curved cutting edge recedes most to the posterior end side in the axial direction is set to be within a range of 0.25×D to 0.4×D with respect to an outer diameter D of the cutting edge.

CITATION LIST

Patent Document

[Patent Document 1]
Japanese Unexamined Patent Application, First Publication No. 2011-104751

SUMMARY OF INVENTION

Technical Problem

The drill described in Patent Document 1 is a counterboring drill as described above. However, as in the drill described in Patent Document 1, a drill, which extends to the tip side in the axial direction after extending to the posterior end side in the axial direction as approaching the inner peripheral side from the outer peripheral end of the cutting edge, is known as a so-called candle drill. For this reason, when a through-hole is drilled in a work material made of a steel material such as stainless steel or made of a metal material such as aluminum, or a laminated plate material of such a metal material and FRP or the like, such a candle drill can suppress generation of burrs when the through-hole is omitted.

Such a candle drill cab be expected to have a certain effect of suppressing burrs in shallow hole drilling, for example, in which the thickness of the work material, that is, the depth of the through-hole is up to about 3 times the outer diameter (diameter) D of the cutting edge. However, in deep hole drilling to drill a through-hole deeper than the shallow hole drilling, there is a concern that the division of chips may become insufficient, which may cause the drill main body to break due to chip clogging, or the chips may be entangled with the drill main body to damage the work material.

In particular, in the drill described in Patent Document 1, in a portion where the cutting edge extends to the posterior end side in the axial direction as approaching the inner peripheral side from the outer peripheral end and a portion where the cutting edge extends to the tip side in the axial direction, directions in which the chips are generated are opposite orientations. Therefore, the chips are split into two in the width direction and generated. For this reason, when the division is insufficient as described above, these chips are entangled with each other, and chip clogging is likely to occur.

Additionally, as in the drill described in Patent Document 1, the radius R4 from the axis to the position where the first concavely curved cutting edge recedes most to the posterior end side in the axial direction is set to be in a range of 0.25×D to 0.4×D with respect to the outer diameter D of the cutting edge. Thus, even in a case where the cutting edge has a large portion that extends to the posterior end side in the axial direction as approaching the inner peripheral side from the outer peripheral end, two chips having approximately equal width are split and generated. Thus, these chips are likely to be entangled with each other. Moreover, at the outer peripheral end of the cutting edge, the portion extending to the posterior end side in the axial direction as approaching the inner peripheral side from the outer peripheral end and the outer peripheral surface of the drill main body intersect each other at an acute angle. Therefore, the strength is insufficient, and fracturing is likely to occur.

The present invention has been made under such a background, and an object of the present invention is to provide a drill capable of preventing chip clogging and chip entanglement to prevent the drill main body from being broken or the work material from being damaged, preventing fracturing at the outer peripheral end of the cutting edge, and further suppressing the generation of burrs, even when deep hole drilling in which a through-hole is deep is performed.

Solution to Problem

According to one aspect of the present invention, a drill is provided including a drill main body, wherein a chip discharging flute opens to a tip flank face of the drill main body and extends to a posterior end, the chip discharging flute being formed at an outer periphery of a tip portion of a drill main body to be rotated around an axis, and a cutting edge that is formed at an intersecting ridge line part between a wall surface of the chip discharging flute facing a drill rotation direction and the tip flank face. The cutting edge includes an inner peripheral cutting edge located on a radially inner peripheral side with respect to the axis, and an outer peripheral cutting edge connected to a radially outer peripheral side of the inner peripheral cutting edge. Also, a drill is provided in which the inner peripheral cutting edge and the outer peripheral cutting edge are inclined to approach the posterior end of the drill main body as approaching the radially outer peripheral with respect to the axis, a point angle of a portion of the inner peripheral cutting edge on the inner peripheral side with respect to the axis is within a range of 90° to 170°, and a radial width of the outer peripheral cutting edge with respect to the axis in a cross section, along the axis, of a rotation locus around the axis is within a range of 5% to 20% of a diameter of the cutting edge, and a point angle of the outer peripheral cutting edge is larger than a point angle of the inner peripheral cutting edge.

In the drill configured in this way, the inner peripheral cutting edge and the outer peripheral cutting edge have different point angles, but both are inclined to the posterior end side of the drill main body as approaching the radially outer peripheral side with respect to the axis. Thus, the directions in which chips are generated are the same orientation. For this reason, it is possible to prevent the chips generated by the inner peripheral cutting edge and the chips generated by the outer peripheral cutting edge from being split in the width direction, and the split chips can be prevented from being entangled with each other.

Additionally, the radial width of the outer peripheral cutting edge with respect to the axis in the cross section, along the axis, of the rotation locus around the axis is within a range of 5% to 20% of the diameter of the cutting edge and is smaller than the radial width of the inner peripheral cutting edge. For this reason, since the wide chips generated by the inner peripheral cutting edge can be discharged so as to involve the narrow chips generated by the outer peripheral cutting edge, and the chips can also be more reliably prevented from being split.

Then, the chips generated in this way are guided so as to be pushed to the inner peripheral side as approaching the posterior end side of the drill main body by the inner peripheral cutting edge in which the point angle of the portion on the inner peripheral side of the drill main body with respect to the axis is within a range of 90° to 170° a, and are given resistance and divided by being brought into sliding contact with the wall surface that is used as the rake face of the cutting edge and faces the drill rotation direction in the chip discharging flute. Therefore, even in deep hole drilling, it is possible to prevent the chip clogging from occurring to break the drill main body or prevent the split chips from being entangled to damage a work material, and stable drilling can be performed.

On the other hand, the point angle of the outer peripheral cutting edge is larger than the point angle of the inner peripheral cutting edge. Thus, the action of the outer peripheral cutting edge to spread the work material when the through-hole is omitted can be suppressed. For this reason, it is possible to suppress the generation of burrs even in a work material made of a steel material such as stainless steel or a metal material such as aluminum or a work material such as a laminated plate material of such a metal material and FRP or the like. Moreover, since the outer peripheral cutting edge intersects the outer peripheral surface of the drill main body at an obtuse angle at an outer peripheral end of the cutting edge, the strength of the outer peripheral end of the cutting edge can be secured to prevent fracturing or the like from occurring.

Here, when the point angle of the portion of the inner peripheral cutting edge on the inner peripheral side with respect to the axis is less than 90°, there is a concern that the tip portion of the inner peripheral cutting edge may become too sharp and fracturing or the like occurs when biting into the work material. Conversely, when the point angle of the portion of the inner peripheral cutting edge on the inner peripheral side with respect to the axis exceeds 170°, the tip portion of the inner peripheral cutting edge becomes nearly flat and hardly bites into the work material. Additionally, when the radial width of the outer peripheral cutting edge with respect to the axis in the cross section, along the axis, of the rotation locus around the axis is less than 5% of the diameter of the cutting edge, the outer peripheral cutting edge becomes too short, and burrs are likely to be generated by the outer peripheral portion of the adjacent inner peripheral cutting edge. Conversely, when the radial width of the outer peripheral cutting edge exceeds 20% of the diameter of the cutting edge, there is a concern that chips are split and generated.

In addition, in a case where the inner peripheral cutting edge further includes an inner peripheral thinning cutting edge located on the radially inner peripheral side with respect to the axis, and an inner peripheral main cutting edge connected to a radially outer peripheral side of the inner peripheral thinning cutting edge, a point angle of the inner peripheral thinning cutting edge may be within a range of 90° to 170° as the point angle of the portion of the inner peripheral cutting edge on the inner peripheral side with respect to the axis. Additionally, in this case, by making the point angle of the inner peripheral main cutting edge smaller than the point angle of the inner peripheral thinning cutting edge, chips can be prevented from being split and generated by the inner peripheral cutting edge.

Moreover, by forming the chip discharging flute so as to be twisted at a twist angle in a range of 20° to 40° to the side opposite to the drill rotation direction as approaching the posterior end of the drill main body, the chips divided by being brought into sliding contact with the wall surface, which is used as the rake face of the cutting edge and faces the drill rotation direction in the chip discharging flute, and given resistance as described above can be smoothly discharged to the posterior end side of the drill main body.

Advantageous Effects of Invention

As described above, according to the present invention, even when deep hole drilling in which a through-hole is deep is performed, chip clogging and chip entanglement can be prevented to prevent the drill main body from being broken or the work material from being damaged, fracturing at the outer peripheral end of the cutting edge can also be prevented, and it is possible to further suppress the generation of burrs.

DESCRIPTION OF EMBODIMENTS

Figure 1:
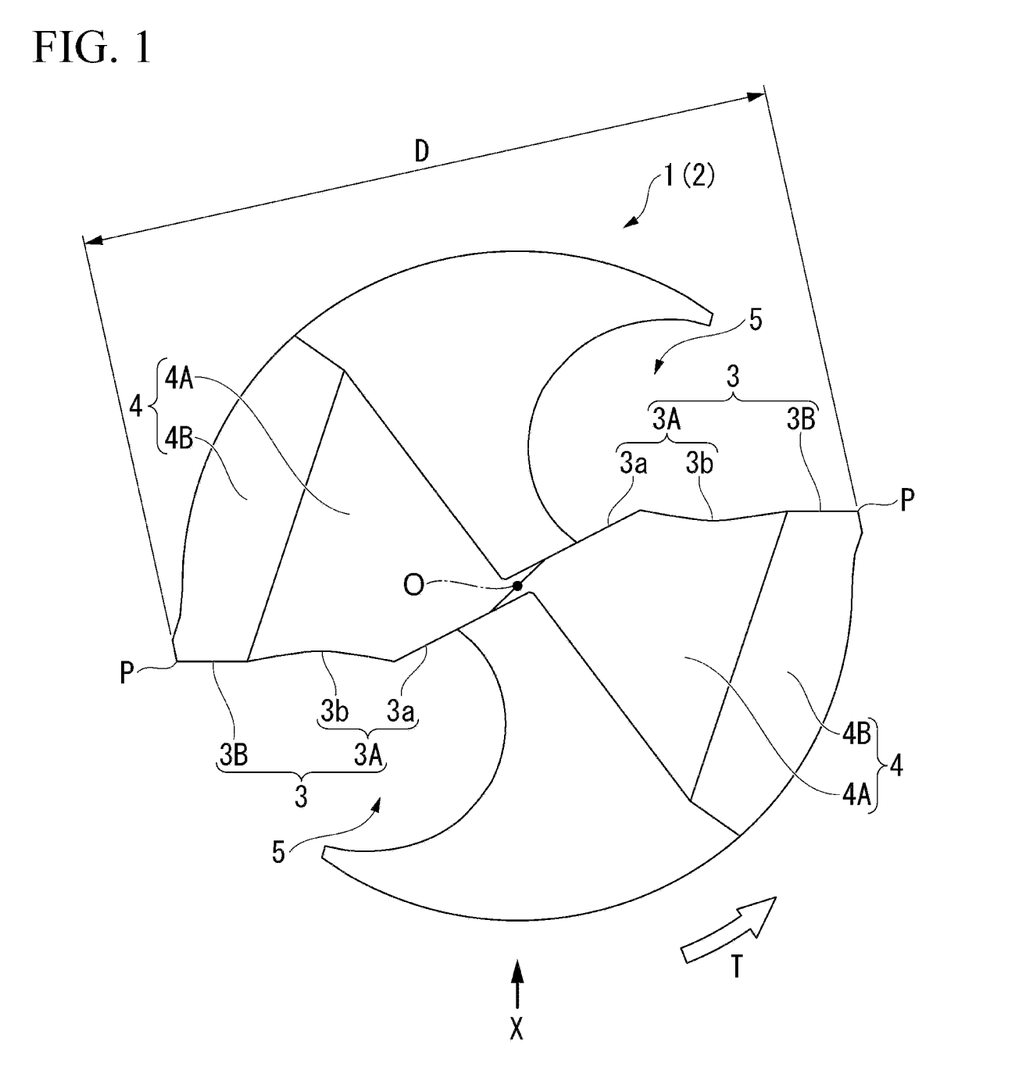
FIG. 1 is a front view showing an embodiment of the present invention as viewed from a tip side in an axial direction.
Figure 2:
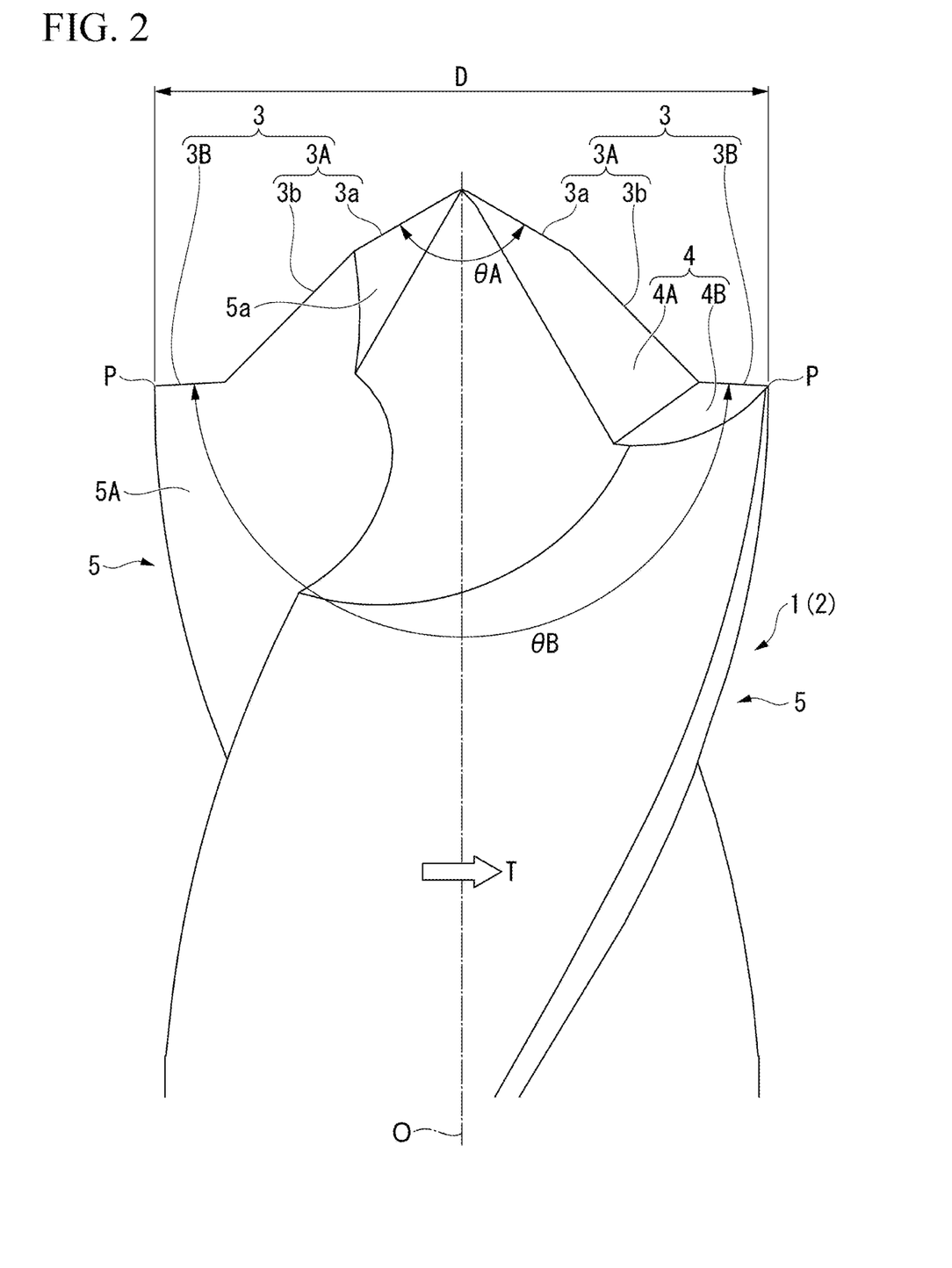
FIG. 2 is a side view as viewed in the direction of arrow X in FIG. 1.
Figure 3:
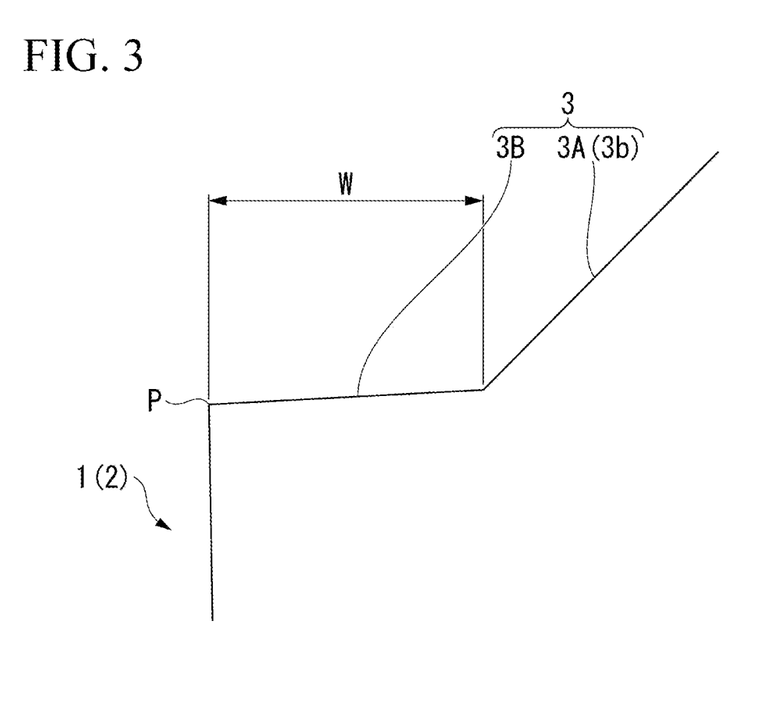
FIG. 3 is a cross-sectional view taken along the axis in a rotation locus, around an axis, of an outer peripheral portion of a cutting edge of the embodiment shown in FIG. 1.

FIGS. 1 to 3 show an embodiment of the present invention. In the present embodiment, a drill main body 1 is formed of a hard material such as cemented carbide in a substantially columnar shape centered on an axis O. A posterior end portion (lower portion in FIG. 2) (not shown) of the drill main body 1 is used as a shank portion that remains columnar, and a tip portion shown in FIG. 1 is used as a cutting edge portion 2.

In such a drill, as the shank portion is gripped by a main spindle of a machine tool, and the drill main body 1 is fed to a tip side (upper side in FIG. 2) in the direction of the axis O while being rotated in a drill rotation direction T around the axis O, drilling for through-holes or the like is performed on a work material by a cutting edge 3 formed on the cutting edge portion 2. The work material is, for example, a steel material such as stainless steel, a metal material such as aluminum, or a laminated plate material of such a metal material and FRP or the like.

A chip discharging flute 5 is formed at an outer periphery of a tip portion of the cutting edge portion 2 so as to open to a tip flank face 4 that is a tip surface of a drill main body 1 and extend to a posterior end side. In the present embodiment, two chip discharging flutes 5 are formed 180° rotationally symmetric with respect to the axis O, and the chip discharging flutes 5 have a twist angle within the range of 20° to 40° and are twisted to a side opposite to the drill rotation direction T as approaching the posterior end side of the drill main body 1.

The cutting edge 3 is formed at an intersecting ridge line part between a wall surface of each chip discharging flute 5 facing the drill rotation direction T and the tip flank face 4. Therefore, a wall surface 5A of the chip discharging flute 5 intersecting the tip flank face 4 and facing the drill rotation direction T in the cutting edge 3 is used as a rake face of the cutting edge 3. Moreover, the tip flank face 4 is inclined toward the posterior end side of the drill main body 1 as approaching an outer peripheral side of the drill main body 1 and a side opposite to the drill rotation direction T. Accordingly, the cutting edge 3 is also inclined toward the posterior end side as approaching the outer peripheral side (a radially outer peripheral side with respect to the axis O) of the drill main body 1 to give a point angle of less than 180° and a clearance angle.

The cutting edge 3 is provided with an inner peripheral cutting edge 3A located on a radially inner peripheral side with respect to the axis O of the drill main body 1, and an outer peripheral cutting edge 3B connected to the radially outer peripheral side of the inner peripheral cutting edge 3A. Also, in the cutting edge 3 that is given a point angle of less than 180° and is inclined to the posterior end side of the drill main body 1 as approaching the radially outer peripheral side as described above, the inner peripheral cutting edge 3A is adapted such that a portion thereof on the inner peripheral side with respect to the axis O has a point angle θA within a range of 90° to 170°, and a point angle θB of the outer peripheral cutting edge 3B, which is similarly inclined to the posterior end side of the drill main body 1 as approaching the radially outer peripheral side, is set to be larger than the point angle θA of the inner peripheral cutting edge 3A. In addition, the point angle θB of the outer peripheral cutting edge 3B may be less than 180°.

Here, the inner peripheral cutting edge 3A further includes an inner peripheral thinning cutting edge 3a located on a radially inner peripheral side with respect to the axis O, and an inner peripheral main cutting edge 3b connected to a radially outer peripheral side of the inner peripheral thinning cutting edge 3a. The point angle θA of the portion of the inner peripheral cutting edge 3A on the inner peripheral side with respect to the axis O is a point angle of the inner peripheral thinning cutting edge 3a, and the point angle of the inner peripheral main cutting edge 3b is smaller than the point angle θA of the inner peripheral thinning cutting edge 3a and therefore smaller than the point angle θB of the outer peripheral cutting edge 3B.

In addition, an inner peripheral portion of the wall surface 5A, which is used as the rake face of the cutting edge 3 and faces the drill rotation direction T, in the chip discharging flute 5 is formed with a planar thinning face 5a extending toward the axis O side as approaching the inner peripheral side of the drill main body 1, and the inner peripheral thinning cutting edge 3a is formed at an intersecting ridge line part between the thinning face 5a and the tip flank face 4. Therefore, the inner peripheral thinning cutting edge 3a is linearly formed as shown in FIG. 1 when viewed from the tip side in the direction of the axis O.

In contrast, the inner peripheral main cutting edge 3b of the inner peripheral cutting edge 3A intersects the inner peripheral thinning cutting edge 3a at an obtuse angle as shown in FIG. 1 when viewed from the tip side in the direction of the axis O and is formed in a concave curve shape that is recessed to the side opposite to the drill rotation direction T. Moreover, the outer peripheral cutting edge 3B is formed in a linear shape that intersects the inner peripheral main cutting edge 3b of the inner peripheral cutting edge 3A at an obtuse angle, similarly, as shown in FIG. 1 when viewed from the tip side in the direction of the axis O.

Additionally, the tip flank face 4 includes a first tip flank face 4A connected to the inner peripheral cutting edge 3A and a second tip flank face 4B connected to the outer peripheral cutting edge 3B. The second tip flank face 4B is formed so as to be inclined to the posterior end side as approaching the outer peripheral side of the drill main body 1 at an angle larger than that of the first tip flank face 4A with respect to the axis O.

Moreover, as shown in FIG. 3, the outer peripheral cutting edge 3B has a radial width W with respect to the axis O in a cross section, along the axis O, of the rotation locus of the drill main body 1 around the axis O, and the axial diameter W is within a range of 5% to 20% of the diameter D of the cutting edge 3 (the outer diameter or drill diameter of the cutting edge 3), that is, the diameter of a circle formed in the rotation locus around the axis O by an outer peripheral end P of the cutting edge 3.

In the drill having such a configuration, since both the inner peripheral cutting edge 3A (inner peripheral thinning cutting edge 3a and inner peripheral main cutting edge 3b) and the outer peripheral cutting edge 3B are inclined to the posterior end side of the drill main body 1 as approaching the radially outer peripheral side with respect to the axis O, directions in which chips are generated are the same orientation. For this reason, it is possible to prevent the chips generated by the inner peripheral cutting edge 3A and the chips generated by the outer peripheral cutting edge 3B from being split in the width direction, and the split chips can be prevented from being entangled with each other.

Additionally, the radial width W of the outer peripheral cutting edge 3B with respect to the axis O in the cross section, along the axis O, of the rotation locus around the axis O is within a range of 5% to 20% of the diameter D of the cutting edge 3 and is smaller than the radial width of the inner peripheral cutting edge 3A. For this reason, since the wide chips generated by the inner peripheral cutting edge 3A can be discharged so as to involve the narrow chips generated by the outer peripheral cutting edge 3B, this can also more reliably prevent the chips from being split.

Then, the chips generated without being split in this way are guided so as to be pushed to the inner peripheral side as approaching the posterior end side of the drill main body 1 by the inner peripheral cutting edge 3A in which the point angle θA of the portion on the inner peripheral side with respect to the axis O is within a range of 90° to 170°, and are given resistance and divided by being brought into sliding contact with the wall surface 5A that is used as the rake face of the cutting edge 3 and faces the drill rotation direction in the chip discharging flute 5. Therefore, even in deep hole drilling, chip clogging can be prevented from occurring in the chip discharging flute 5 to break the drill main body 1 or the split chips can be prevented from being entangled to damage a work material, and it is possible to perform stable drilling.

On the other hand, the point angle θB of the outer peripheral cutting edge 3B is larger than the point angle θA of the portion of the inner peripheral cutting edge 3A on the inner peripheral side with respect to the axis O. Thus, even in a case where a through-hole is drilled, the action of the outer peripheral cutting edge 3B to spread the work material when the through-hole is omitted can be suppressed. For this reason, it is possible to suppress the generation of burrs even a work material made of a steel material such as stainless steel, a metal material such as aluminum, or a laminated plate material of such a metal material and FRP or the like. Additionally, since the outer peripheral cutting edge 3B intersects the outer peripheral surface of the drill main body 1 at an obtuse angle at the outer peripheral end P of the cutting edge 3, the strength of the outer peripheral end P of the cutting edge 3 can be maintained, and fracturing or the like can be prevented from occurring.

Here, when the point angle θA of the portion of the inner peripheral cutting edge 3A on the inner peripheral side with respect to the axis O is less than 90°, there is a concern that the tip portion of the inner peripheral cutting edge 3A may become too sharp and fracturing or the like occurs when biting into the work material. Additionally, conversely, when the point angle θA of the portion of the inner peripheral cutting edge 3A on the inner peripheral side with respect to the axis O exceeds 170°, the tip portion of the inner peripheral cutting edge 3A becomes nearly flat and hardly bites into the work material.

Moreover, when the radial width W of the outer peripheral cutting edge 3B with respect to the axis O in the cross section, along the axis O, of the rotation locus around the axis O is less than 5% of the diameter D of the cutting edge 3, the outer peripheral cutting edge 3B becomes too short, and burrs are likely to be generated when the through-hole is omitted by the outer peripheral portion of the inner peripheral cutting edge 3A adjacent to the outer peripheral cutting edge 3B. On the other hand, conversely, when the radial width W of the outer peripheral cutting edge 3B exceeds 20% of the diameter D of the cutting edge 3, there is a concern that the chips generated by the outer peripheral cutting edge 3B become wider and are split from the chips generated by the inner peripheral cutting edge 3A.

Additionally, in the present embodiment, the inner peripheral cutting edge 3A includes the inner peripheral thinning cutting edge 3a located on the radially inner peripheral side with respect to the axis O and the inner peripheral main cutting edge 3b connected to the radially outer peripheral side of the inner peripheral thinning cutting edge 3a, and the range of the point angle θA of the portion of the inner peripheral cutting edge 3A on the inner peripheral side with respect to the axis O is within a range of 90° to 170° of the inner peripheral thinning cutting edge 3a as the point angle of the inner peripheral thinning cutting edge 3a. Since the point angle of the inner peripheral main cutting edge 3b is smaller than the point angle θA of the inner peripheral thinning cutting edge 3a, the chips can be prevented from being split and generated by the inner peripheral thinning cutting edge 3a and the inner peripheral main cutting edge 3b of the inner peripheral cutting edge 3A.

Moreover, in the present embodiment, the chip discharging flute 5 is formed so as to be twisted at a twist angle in a range of 20° to 40° to the side opposite to the drill rotation direction T as approaching the posterior end side of the drill main body 1. For this reason, the chips divided by being brought into sliding contact with the wall surface 5A, which is used as the rake face of the cutting edge 3 and faces the drill rotation direction T in the chip discharging flute 5, and given resistance as described above can be smoothly discharged to the posterior end side of the drill main body 1 with the rotation of the drill main body 1.

Figure 4:
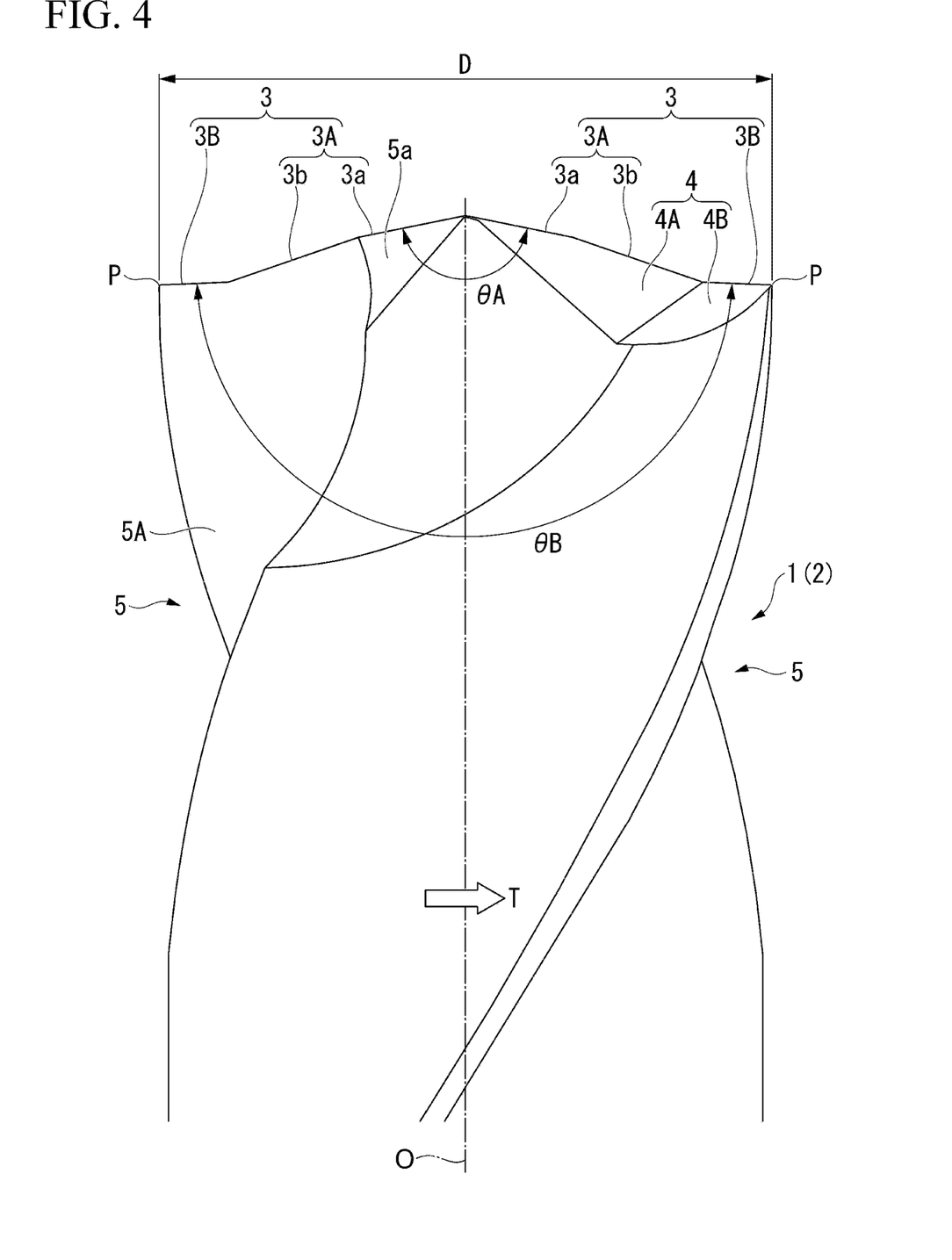
FIG. 4 is a side view corresponding to the side view as viewed in the direction of the arrow X in FIG. 1, showing a first modification example of the embodiment shown in FIGS. 1 to 3.
Figure 5:
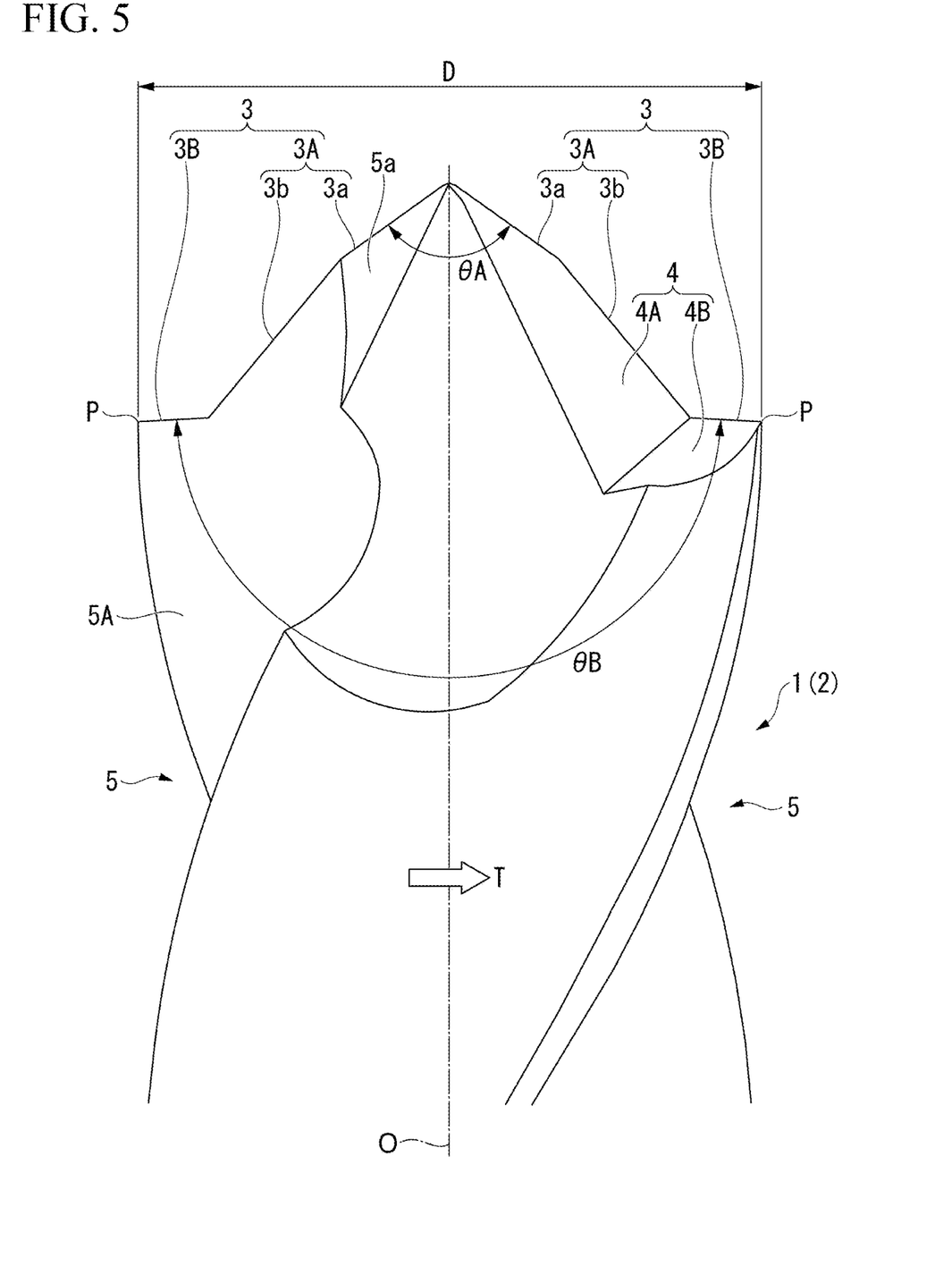
FIG. 5 is a side view corresponding to the side view as viewed in the direction of the arrow X in FIG. 1, showing a second modification example of the embodiment shown in FIGS. 1 to 3.

Next, FIGS. 4 and 5 are side views corresponding to the side view as viewed in the direction of arrow X in FIG. 1, showing first and second modification examples of the drill of the above embodiment, respectively, and the same reference numerals are given to the same portions as those of the embodiment shown in FIGS. 1 to 3. In these modification examples, the first modification example shown in FIG. 4 is a case where the point angle θA of the portion of the inner peripheral cutting edge 3A (inner peripheral thinning cutting edge 3a) on the inner peripheral side with respect to the axis O is 150°, and the second modification example shown in FIG. 5 is a case where the point angle θA the portion of the inner peripheral cutting edge 3A (inner peripheral thinning cutting edge 3a) on the inner peripheral side with respect to the axis O is 90°.

Even in the drills of such first and second modification examples, the point angle θA of the portion of the inner peripheral cutting edge 3A on the inner peripheral side with respect to the axis O is within a range of 90° to 170°, the radial width W of the outer peripheral cutting edge 3B with respect to the axis O in the cross section, along the axis O, of the rotation locus around the axis O is within a range of 5% to 20% of the diameter D of the cutting edge 3, and the point angle θB of the outer peripheral cutting edge 3B is larger than the point angle θA of the inner peripheral cutting edge 3A. Thus, the same effect as those of the above embodiment can be obtained.

INDUSTRIAL APPLICABILITY

According to the present invention, even when deep hole drilling in which a through-hole is deep is performed, chip clogging and chip entanglement can be prevented to prevent the drill main body from being broken or the work material from being damaged, fracturing at the outer peripheral end of the cutting edge can also be prevented, and it is possible to further suppress the generation of burrs.

REFERENCE SIGNS LIST

1: Drill main body
3: Cutting edge
3A: Inner peripheral cutting edge
3a: Inner peripheral thinning cutting edge
3b: Inner peripheral main cutting edge
3B: Outer peripheral cutting edge
4: Tip flank face
5: Chip discharging flute
5A: Wall surface (rake face) of chip discharging flute 5 facing drill rotation direction T
O: Axis of drill main body 1
T: Drill rotation direction
P: Outer peripheral end of cutting edge 3
D: Diameter of cutting edge 3
W: radial width of outer peripheral cutting edge 3B with respect to axis O in
cross section, along axis O, of rotation locus around axis O.
θA: Point angle of inner peripheral cutting edge 3A of portion of inner
peripheral side with respect θA axis O (point angle of inner peripheral thinning cutting edge 3a)
θB: Point angle of outer peripheral cutting edge 3B

What is claimed is:

1. A drill comprising a drill main body, wherein
a chip discharging flute opens to a tip flank face of the drill main body and extends to a posterior end side, the chip discharging flute being formed at an outer periphery of a tip portion of the drill main body to be rotated around an axis,
a cutting edge is formed at an intersecting ridge line part between a wall surface of the chip discharging flute facing a drill rotation direction and the tip flank face,
the cutting edge includes:
an inner peripheral cutting edge located on a radially inner peripheral with respect to the axis; and
an outer peripheral cutting edge connected to the inner peripheral cutting edge on a radially outer peripheral side of the inner peripheral cutting edge, an outer peripheral end of the outer peripheral cutting edge being an outer peripheral end of the cutting edge,
the inner peripheral cutting edge and the outer peripheral cutting edge are inclined toward the posterior end of the drill main body as approaching the radially outer peripheral with respect to the axis,
a point angle of a portion of the inner peripheral cutting edge on the inner peripheral side with respect to the axis is within a range of 90° to 170°,
a radial width of the outer peripheral cutting edge with respect to the axis in a cross section, along the axis, of a rotation locus around the axis is within a range of 5% to 20% of a diameter of the cutting edge, and a point angle of the outer peripheral cutting edge is larger than a point angle of the inner peripheral cutting edge,
the inner peripheral cutting edge includes:
an inner peripheral thinning cutting edge located on the radially inner peripheral side with respect to the axis; and
an inner peripheral main cutting edge connected to the inner peripheral thinning cutting edge on a radially outer peripheral side of the inner peripheral thinning cutting edge, and connected to the outer peripheral cutting edge on a radially inner peripheral side of the outer peripheral cutting edge,
a point angle of the inner peripheral thinning cutting edge is within a range of 90° to 170° as the point angle of a portion of the inner peripheral cutting edge on the inner peripheral side with respect to the axis, and
a point angle of the inner peripheral main cutting edge is smaller than the point angle of the inner peripheral thinning cutting edge,
the inner peripheral thinning cutting edge is linearly formed when viewed from a tip side in a direction of the axis,
the inner peripheral main cutting edge intersects the inner peripheral thinning cutting edge at an obtuse angle when viewed from the tip side in the direction of the axis, and is formed in a concave curve shape that is recessed to a side opposite to the drill rotation direction, and
the outer peripheral cutting edge is formed in a linear shape that intersects the inner peripheral main cutting edge at an obtuse angle when viewed from the tip side in the direction of the axis.

2. The drill according to claim 1,
wherein the chip discharging flute is twisted at a twist angle in a range of 20° to 40° to a side opposite to the drill rotation direction as approaching the posterior end of the drill main body.

* * * * *